Oct. 19, 1954 R. F. WILD 2,692,358
ELECTRIC MOTOR POSITIONING SYSTEM
Original Filed Nov. 3, 1949
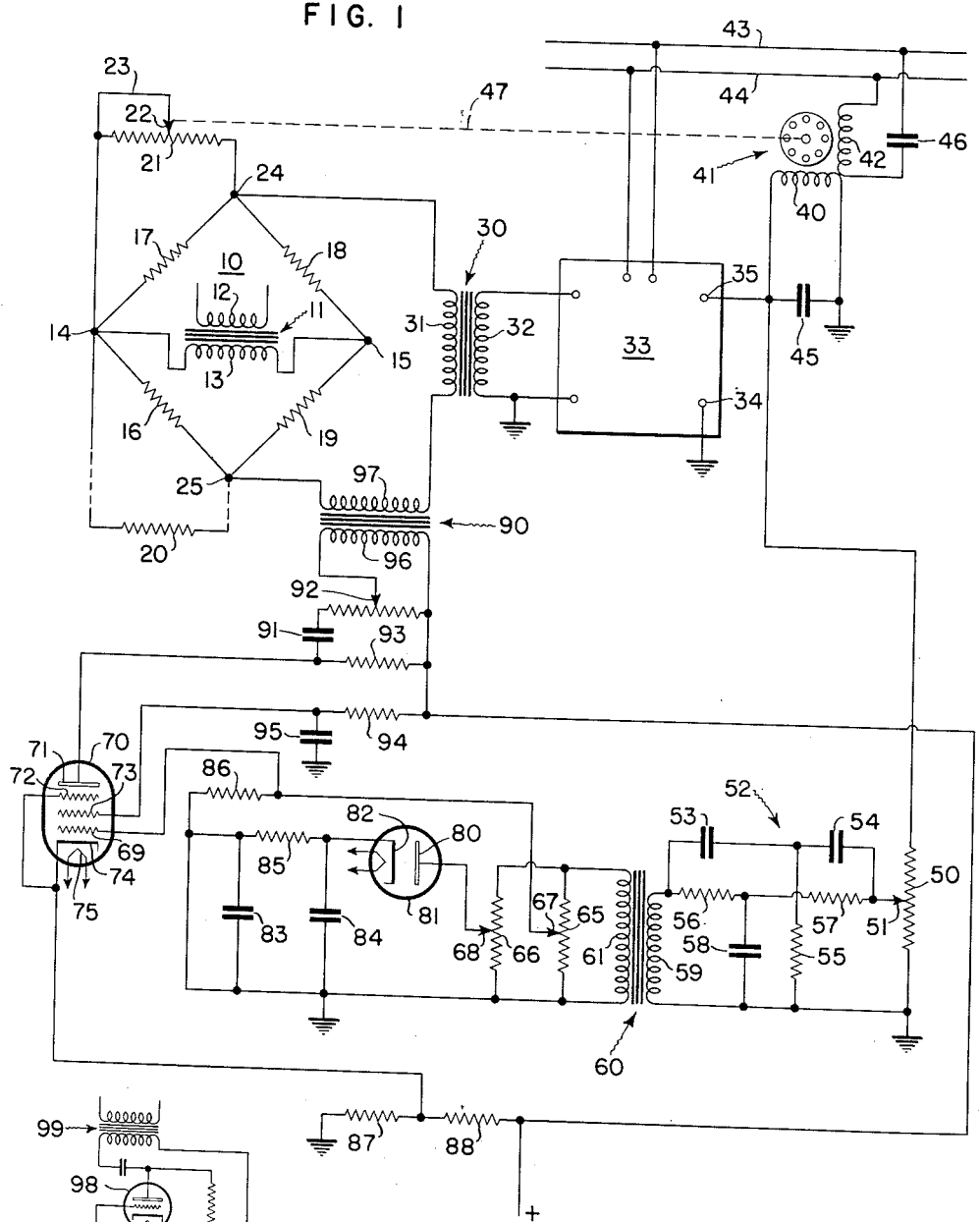
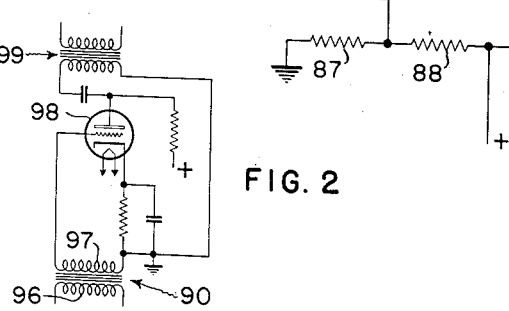
*INVENTOR.*
RUDOLF F. WILD
BY
Arthur H. Swanson
ATTORNEY.

Patented Oct. 19, 1954

2,692,358

UNITED STATES PATENT OFFICE 2,692,358

ELECTRIC MOTOR POSITIONING SYSTEM

Rudolf F. Wild, Wilmington, Del., assignor to Minneapolis-Honeywell Regulator Company, Minneapolis, Minn., a corporation of Delaware Original application November 3, 1949, Serial No. 125,199, now Patent No. 2,595,034, dated April 29, 1952. Divided and this application March 29, 1952, Serial No. 279,375

14 Claims. (Cl. 318—29)

This present application is a divisional application of application Serial Number 125,199, filed November 3, 1949, entitled "Anti-Hunting Measuring and Control Apparatus," now Patent No. 2,595,034, issued April 29, 1952.

The general object of the present invention is to provide motor damping means for measuring and controlling apparatus including a motor and motor control means for automatically effecting a rebalancing or follow up adjustment of a measuring circuit on variations in the value of the quantity measured by said circuit. The invention was devised primarily for use with measuring apparatus including a voltage amplifier and motor drive mechanism of the widely used type disclosed and claimed in the Wills patent, 2,423,540 of July 8, 1947. The control signal amplified in said voltage amplifier is an alternating current signal of relatively low frequency. That frequency is usually 60 cycles per second, and, as of a matter of convenience, the signal frequency used in all forms of the invention will be hereinafter assumed to be 60 cycles per second though the particular signal frequency is not an essential feature of the present invention.

In my above mentioned parent application, the operation of a motor drive mechanism as disclosed in the Wills patent is characterized by the variations in the components of the current flowing through the control winding of a reversible two-phase rebalancing mechanism. When a balancing condition has been attained, the current flowing through the motor control winding will include a relatively large alternating component having a frequency of 120 cycles per second, which is double the frequency of the alternating motor control signal.

A primary object of this present invention is to provide simple and effective means for using the 60 cycle component, and not the 120 cycle component, of the control winding current in developing a damping voltage which is fed back into the amplifier to stabilize the operation of the apparatus and expanding or amplifying the damping voltage by an amount corresponding to the magnitude of the damping voltage.

In that condition of operation, the control winding current includes substantially no 60 cycle component. When the measuring apparatus is unbalanced to a substantial extent and the rebalancing motor is operating at full speed, the motor control winding current includes a realtively large 60 cycle alternating current component, a direct current component which is comparatively small and substantially no 120 cycle component. As balance is being approached and the speed of the rebalancing motor is progressively reduced, the 60 cycle component of the control winding current progressively diminishes and fades away and a 120 cycle component develops and progressively increases, and the direct current component progressively increases through a range of operating conditions.

A further object of the present invention is to provide an apparatus having a motor damping voltage which is proportional to the speed of the motor wherein the motor damping voltage is passed through a variable gain electronic amplifying device whose gain is varied in accordance with the magnitude of the damping voltage.

Another object of the present invention is to provide an improved motor control apparatus having a motor damping voltage proportional to motor speed and an asymmetrically conductive device cooperating with a variable mu amplifying device to expand the damping voltage in accordance with the magnitude of the damping voltage.

Still another object is to provide an improved motor damping apparatus where the magnitude of the motor damping signal regulates the gain of a variable mu amplifying tube and a frequency selective filter prevents harmonics of the damping signal from affecting the gain of said amplifying tube.

A still further object of the present invention is to provide an improved damping signal expansion circuit wherein the magnitude of the damping signal is limited when it exceeds a predetermined value.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1 is a diagrammatic showing of one form that my invention may assume.

Figure 2 is a modification for the apparatus showing in Figure 1.

Referring to Figure 1, the numeral 10 represents an electrical bridge circuit which has power supplied thereto by a suitable power transformer 11. The transformer 11 has a primary winding 12 and a secondary winding 13, the latter of which is connected to the bridge input terminals at 14 and 15. The bridge includes as elements thereof fixed resistors, 16, 17, 18, and 19. A condition or variable sensing resistor 20 is connected in parallel with the resistor 16 while a follow up or rebalancing slidewire 21 is connected in parallel with the resistor 17. The slidewire 21 has a slider 22 thereon which cooperates with a shorting wire 23 to short out a portion of the resistance of the slidewire 21. The bridge 10 has output terminals at 24 and 25.

The output signal from the bridge 10 passes through a transformer 30 having a primary winding 31 and a secondary winding 32, the latter of which is connected to the input of an amplifier 33. This amplifier is of the type disclosed in the above mentioned Wills patent and produces, on its output terminals at 34 and 35, motor device signal which will be of a 60 cycle frequency phased directly in accordance with the direction of unbalance of the input signal to the amplifier. The motor drive signal is applied to a control winding 40 of a reversible motor 41. The motor 41 also has a line winding 42 which is continuously energized by power supplied from input power lines 43 and 44. A condenser 45 is connected in parallel with winding 40 while a condenser 46 is connected in series with winding 42. These condensers serve to maintain proper phasing of the currents in the windings 40 and 42 so that the rotor of the motor 41 will rotate when the proper currents flow through the windings. The motor 41 has a suitable driving connection 47 to the slider 22.

Voltages appearing across the control winding 40 will appear across a potentiometer resistor 50 having a slider 51. The slider 51 in turn serves as an input connection to a parallel T filter network 52. This filter network includes in one T a pair of condensers 53 and 54 and a resistor 55. In the outer T, there is a pair of resistors 56 and 57 and a condenser 58. The output of the parallel T filter network is connected to a primary winding 59 of a transformer 60 which also has a secondary winding 61. The filter is tuned so as to pass 60 cycles present on its input but to bypass any second harmonic or 120 cycle signals present.

The secondary winding 61 is connected to a pair of potentiometer resistors 65 and 66 each having an associated slider 67 and 68, respectively. The slider 67 is connected to a control grid 69 on a variable mu tube 70. This variable mu tube has an anode 71, suppressor grid 72, screen grid 73, and cathode 74, the latter of which is arranged to be rendered electron emissive by a suitable heater 75. This tube 70 has the characteristic of having wide changes in its gain or amplification factor as the bias on the control grid 69 is varied.

The slider 68 is connected to the anode 80 of an asymmetrically conductive device diode 81 which also has a cathode 82. The cathode 82 is in turn connected to a filter comprising a pair of condensers 83 and 84 and a resistor 85. The output of the filter is connected by an isolating resistor 86 to the input control grid 69 of the variable mu tube 70.

The cathode 74 of the tube 70 has a fixed bias applied thereto by a connection to a voltage divider including resistors 87 and 88. The anode 71 is connected to a feedback transformer 90 through a phase shifting or correcting network including a condenser 91 and potentiometer 92. A resistor 93 functions as a normal plate load resistor for tube 70. A resistor 94 acts as a screen grid load resistor while a condenser 95 acts as a screen by-pass condenser. The transformer 90 has an input winding 96 and an output winding 97, the latter of which applies a feedback signal in series with the output of the bridge 10 to the primary winding 31 of input transformer 30.

In considering the operation of the present invention, consider first the condition of apparatus balance when there is no input signal to the amplifier 33 and no motor drive signal on motor 41. Under these conditions, the motor will be at rest. Due to the amplifier design, there will be a 120 cycle signal present on the motor control winding 40 as well as a direct current component of signal. The 120 cycle signal is applied to the input of the parallel T filter and is by-passed to ground due to the fact that filter components are selected to shunt any 120 cycle signal. The direct current component of signal on the winding 40 is not effective in the feedback circuit because of the direct current blocking action of the transformer 60. With no feedback signal going beyond the transformer 60, the apparatus will remain stationary. If there should be an unbalance signal originating in the bridge 10 due to a change in the resistance of variable sensing element 20, this unbalance will appear as a 60 cycle signal on the input of amplifier 33 and will be of a phase which will correspond to the direction of unbalance of the bridge. This signal will produce on the output a 60 cycle motor drive signal which will be phased to drive the motor 41 in a direction which will cause the slider 22 to move in a balancing direction on slidewire 21. The magnitude of the 60 cycle motor drive signal voltage on control winding 40 will be proportional to the speed of the motor. This voltage will appear on the input of the parallel T filter 52 and, since the filter 52 will pass 60 cycles, a 60 cycle signal will appear on the output of the transformer 60 on winding 61.

The 60 cycle signal appearing on the output of the winding 61 is applied to the control grid 69 of the tube 70 by way of the slider 67 on resistor 65. The signal is also rectified by the action of the diode 81 and appears as a filtered direct current signal voltage on the input of tube 70 on control grid 69. The polarity of this voltage is such that the grid will become less negative with respect to the cathode and the amplifying action of the tube 70 will be increased. The output signal from the tube 70 will be a 60 cycle signal which is applied through the phase shifting network to the input winding 96 of transformer 90. The output winding 97 is so arranged that any 60 cycle signal appearing thereon will be in phase opposition to any unbalance or motor drive signal from the bridge so that the net input signal to amplifier 33 will be the vector sum of the voltage from the bridge and from the winding 97. This will result in a smaller net motor drive signal.

If the speed of the motor increases there will be a larger signal applied through the filter 52 and the bias on tube 70 will be again changed. This change will cause an even larger damping signal to be fed back into the input circuit. With the variable mu tube arranged in the circuit as the present one, and with linear changes in the magnitude of the motor drive signal, there will be an expanded signal fed back to the input and this signal will vary at a rate which is greater than the first power.

As the apparatus approaches its balance point with the inertia of the motor 41 causing it to coast, there will appear across the control winding 40 a voltage which will be larger than the motor drive voltage from the amplifier 33. This will mean that the electronic damping signal expansion circuit will produce a damping signal which will considerably override that from the bridge 10 and there will be a net input signal to the amplifier 33 tending to cause a reverse motor drive signal to be applied to control winding 40. This damping action will quickly arrest the rotation of motor 41. By proper adjustment of the sliders 51 and 62, the damping action can cause the motor to stop directly at the balance point without any overshoot or hunting.

It will thus be seen that with the varying of the damping signal circuit gain directly in accordance with the magnitude of the signal voltage appearing on the winding 40 that there is produced a highly sensitive yet stable motor control apparatus.

In certain types of motor control it is desired to have the expanded damping signal fully effective when at or near the balance point of the apparatus and to minimize the damping signal when there is a large unbalance when a high unbalancing motor speed is desired.

In such case the circuit modification shown in Figure 2 may be incorporated. This circuit includes as its input the transformer 90 which is arranged to supply its damping signal to a self-biased triode 98 which in turn has an output transformer 99 which may have its output winding connected in series with the output terminals of bridge 10, shown in Figure 1. This circuit functions to limit the damping signal only when the signal exceeds a predetermined value, said value being determined by the selection of the circuit constants of the limiting circuit. This will permit the motor drive signal to be larger than when no damping signal limiting is present and will not offset the damping signal expansion when that signal is smaller in magnitude.

It will be obvious to those skilled in the art that many of the modifications shown in my parent application as well as others may well be incorporated within the concept of the present invention and that the invention is also well adapted for use in other types of motor control apparatus.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In self-balancing measuring apparatus comprising a circuit network including an alternating current amplifying and motor controlling device having an input circuit and an output circuit, and including a normally balanced measuring circuit adapted to be unbalanced by a change in a measured condition and adapted, when so unbalanced, to provide an appropriate output signal, means connecting said measuring circuit to said input circuit and operative to impress on the latter an alternating current motor drive signal corresponding to said output signal, of a predetermined frequency, and of a phase depending upon the direction of measuring circuit unbalance, said output signal and hence said motor drive signal being operative to fade away as measuring circuit balance is closely approached and attained in a subsequent rebalancing operation, and a reversible rebalancing motor including a control winding connected to said output circuit and operative, under the control of said amplifying and motor controlling device, to effect rebalancing operations on said measuring circuit when the latter is unbalanced, said amplifying and motor controlling device, to effect rebalancing operations on said measuring circuit when the latter is unbalanced, said amplifying and motor controlling device including means operative to impress on said control winding, through said output circuit, an output current having a rebalancing component operative to cause said motor to effect said rebalancing operations and being of said predetermined frequency and of a phase and magnitude respectively dependent upon the phase and magnitude of said motor drive signal, said output current also having a component of a frequency which is higher than said predetermined frequency and which appears across said control winding as said motor drive signal fades away, the improved motor damping arrangement comprising a damping circuit connected in a feedback path between said control winding and a portion of said network portion and an input portion connected across said control winding, whereby said rebalancing and said higher frequency current components, when present, are applied to said input portion from said control winding, a stage of amplification of variable gain connected between said input and output portions, and including means responsive to the magnitude of said rebalancing current component and operative to vary the gain of said stage of amplification in direct accordance with the magnitude of said rebalancing current component and frequency selective means included in said damping circuit between said input and output portions and operative to permit said rebalancing current component to produce in said output portion a damping signal having a magnitude and sense which are respectively dependent upon the magnitude and phase of said rebalancing current component, said portion of said network being so chosen that the magnitude and sense of said damping signal are such as to cause said damping signal to reduce the effective magnitude of said motor drive signal, frequency selective means being operative also to prevent said higher frequency current component from appearing in said damping signal, whereby the latter is made solely dependent upon said rebalancing current component and is rendered substantially entirely independent of said higher frequency current component, thereby to effect efficient damping of said motor without permitting said higher frequency current component to reduce the sensitivity of the apparatus at or near the balanced condition of said measuring circuit.

2. In self-balancing measuring apparatus comprising a circuit network including an alternating current amplifying and motor controlling device having an input circuit and an output circuit, and including a normally balanced measuring circuit adapted to be unbalanced by a change in a measured condition and adapted, when so unbalanced, to provide an appropriate output signal, means connecting said measuring circuit to said input circuit and operative to impress on the latter an alternating current motor drive signal corresponding to said output signal, of a predetermined frequency, and of a phase depending upon the direction of measuring circuit unbalance, said output signal and hence said motor drive signal being operative to fade away as measuring circuit balance is closely approached and attained in a subsequent rebalancing operation, and a reversible rebalancing motor including a control winding connected to said output circuit and operative, under the control of said amplifying and motor controlling device to effect rebalancing operations on said measuring circuit when the latter is unbalanced, said amplifying and motor controlling device including means operative to impress on said control winding, through said output circuit, an output current having a rebalancing component operative to cause said motor to effect said rebalancing operations and being of said predetermined frequency and of a phase and magnitude respectively dependent upon the phase and magnitude of said motor drive signal, the improved motor damping arrangement comprising a damping circuit, said damping circuit including an output portion connected in feedback relation to said network portion and an input portion connected across said control winding, said portion of said network being so chosen that the magnitude and sense of said damping signal are such as to cause said damping signal to reduce the effective magnitude of said motor drive signal, said damping circuit also including a stage of amplification of variable gain connected between said input and output portions, and including means responsive to the magnitude of said rebalancing current component and operative to vary the gain of said stage of amplification in direct accordance with the magnitude of said rebalancing current component.

3. An apparatus of the class described comprising in combination: a source of signal voltage of reversible sense; an electrical amplifying device having an input and output circuit; circuit means connecting said signal voltage to said input circuit; an electric motor connected to said output circuit; said motor being operative in one direction or the other depending upon the sense of said signal voltage; means including said motor for producing a second source of signal voltage having a magnitude dependent upon the speed of said motor; signal expanding means comprising a non-linear electronic device and having input and output circuits; and circuit means connecting said second source of signal voltage to the input circuit of said signal expanding means and connecting the output circuit of said signal expanding means in feedback relation to the input circuit of said electrical amplifying device.

4. An apparatus of the class described comprising in combination; a balanceable network to produce a signal voltage of reversible sense depending on the direction of unbalance; an electrical amplifying device having an input and an output circuit; circuit means connecting said signal voltage to said input circuit; an electric motor connected to said output circuit; said motor being operative in one direction or the other depending upon the sense of said signal voltage to rebalance said network; means including said motor for producing a second source of signal voltage having a magnitude dependent upon the speed of said motor; signal expanding means comprising a non-linear electronic device and having input and output circuits; and circuit means connecting said second source of signal voltage to the input circuit of said signal expanding means and the output of said device in feedback relation to the input circuit of said electrical amplifying device.

5. An apparatus of the class described comprising in combination: a source of signal voltage of reversible sense; an electrical amplifying device having an input and an output circuit; circuit means connecting said signal voltage to said input circuit; an electric motor connected to said output circuit, said motor being operative in one direction or the other depending upon the sense of said signal voltage; means including said motor for producing a second source of signal voltage having a magnitude and a sense dependent upon the speed and direction of rotation of said motor; signal expanding means comprising a biased non-linear electronic device and having input and output circuits, the input circuit of said non-linear device comprising means to vary the bias of said non-linear device in proportion to the magnitude of a signal applied to the input circuit of said non-linear device; and circuit means connecting said second source of signal voltage to the input circuit of said signal expanding means and connecting the output circuit of said signal expanding means in feedback relation to the input circuit of said electrical amplifying device in opposition to said first signal voltage.

6. An apparatus of the class described comprising in combination: a source of signal voltage of reversible sense; an electrical amplifying device having an input and an output circuit; circuit means connecting said signal voltage to said input circuit; an electric motor connected to said output circuit, said motor being operative in one direction or the other depending upon the sense of said signal voltage; means including said motor for producing a second source of signal voltage having a magnitude and a sense dependent upon the speed and direction of rotation of said motor; signal expanding means comprising a biased non-linear electronic device and having input and output circuits, the input circuit of said non-linear device comprising means to vary the bias of said non-linear device in proportion to the magnitude of a signal applied to the input circuit of said non-linear device; and circuit means connecting said second source of signal voltage to the input circuit of said signal expanding means and connecting the output circuit of said signal expanding means in feedback relation to the input circuit of said electrical amplifying device in opposition to said first signal voltage, said circuit means including in said input connection a frequency selective means to prevent unwanted signals from said second source of signal voltage from appearing on the input of said non-linear device.

7. Motor control apparatus comprising in combination: a control signal source; a controlled motor; amplifying means connecting said source in a driving relation to said controlled motor; means including said motor for producing a speed signal proportional to the speed of said controlled motor; and means connecting said speed signal to said amplifying means in opposition to said control signal source, said last named means comprising electronic signal expanding means including electrical amplifying means having a gain which is varied in accordance with the magnitude of said speed signal.

8. Motor control apparatus comprising in combination: a control signal source; a controlled motor; amplifying means connecting said source in a driving relation to said controlled motor; means including said motor for producing a speed signal proportional to the speed of said controlled motor; and means connecting said speed signal in feedback relation to said amplifying means and in opposition to said control signal source, said last named means comprising a variable gain amplifying device having an input circuit which comprises electrical means connected to decrease the bias on said device with increases in magnitude of said speed signal.

9. Motor control apparatus comprising in combination: a control signal source; a controlled motor; amplifying means connecting said source in a driving relation to said controlled motor; means for producing a speed signal proportional to the speed of said controlled motor; and means connecting said speed signal in feedback relation to said amplifying means and in opposition to said control signal source, said last named means comprising a variable gain amplifying device having an input circuit which comprises electrical means connected to decrease the bias on said device with increases in magnitude of said speed signal and a frequency selective filter for preventing unwanted components of said speed signal from affecting said variable gain amplifying device.

10. In a motor damping apparatus, the combination comprising a source of damping signal voltage proportional to the speed of operation of a controlled motor and a feedback circuit for said damping voltage signal source and connected thereto, signal expanding means comprising a variable gain amplifying device connected in said feedback circuit, and filter means connected in said circuit for passing only desired signal from said source to said expanding means.

11. In a motor damping apparatus, the combination comprising a controlled motor, a source of damping signal having an output proportional to the speed of rotation of said motor, and a feedback circuit for connecting said source to damp said motor, said feedback circuit including amplifying means for variably amplifying the damping signal in accordance with the magnitude of said signal, and filter means connected in said feedback circuit to pass only a selected signal to said amplifying means and render variations in amplification of said amplifying means only due to said selected signal.

12. In a motor control apparatus, the combination comprising, a controlled motor, a source of motor damping signal which has an output signal proportional to the speed of rotation of said motor, and a damping feedback circuit from said source to said motor, said feedback circuit including electrical signal expanding means including a variable gain amplifying device and a limiting circuit for limiting the magnitude of the signal in said feedback when said signal exceeds a predetermined value.

13. In a motor control apparatus, the combination comprising, a controlled motor, a source of motor damping signal which has an output signal proportional to the speed of rotation of said motor, and a damping feedback circuit from said source to said motor, said feedback circuit comprising, a variable mu amplifying device with asymmetrically conductive means for varying the apparent bias of said amplifying device in accordance with the magnitude of the signal from said source, and filter means for passing only a selected signal from said source to said amplifying device.

14. In a motor control apparatus, the combination comprising, a controlled motor, a source of motor damping signal which has an output signal proportional to the speed of rotation of said motor, and a damping feedback circuit from said source to said motor, said feedback circuit comprising, a variable mu amplifying device with asymmetrically conductive means for varying the apparent bias of said amplifying device in accordance with the magnitude of the signal from said source, and signal limiting means connected in said circuit to limit the magnitude of the signal therein when said signal exceeds a predetermined value.

References Cited in the file of this patent

UNITED STATES PATENTS

| Number | Name | Date |
| --- | --- | --- |
| 2,446,563 | Upton | Aug. 10, 1948 |
| 2,472,167 | Matson, Jr., et al. | June 7, 1949 |
| 2,508,640 | Kuhlemeier | May 23, 1950 |
| 2,527,665 | Wild | Oct. 31, 1950 |
| 2,528,017 | Stanton | Oct. 31, 1950 |
| 2,544,922 | Greenough | Mar. 13, 1951 |
| 2,666,169 | Jarvis | Jan. 12, 1954 |